Jan. 12, 1932.   J. C. CREAGMILE   1,840,766
WHEEL ALIGNING DEVICE
Filed Dec. 31, 1929   3 Sheets-Sheet 1
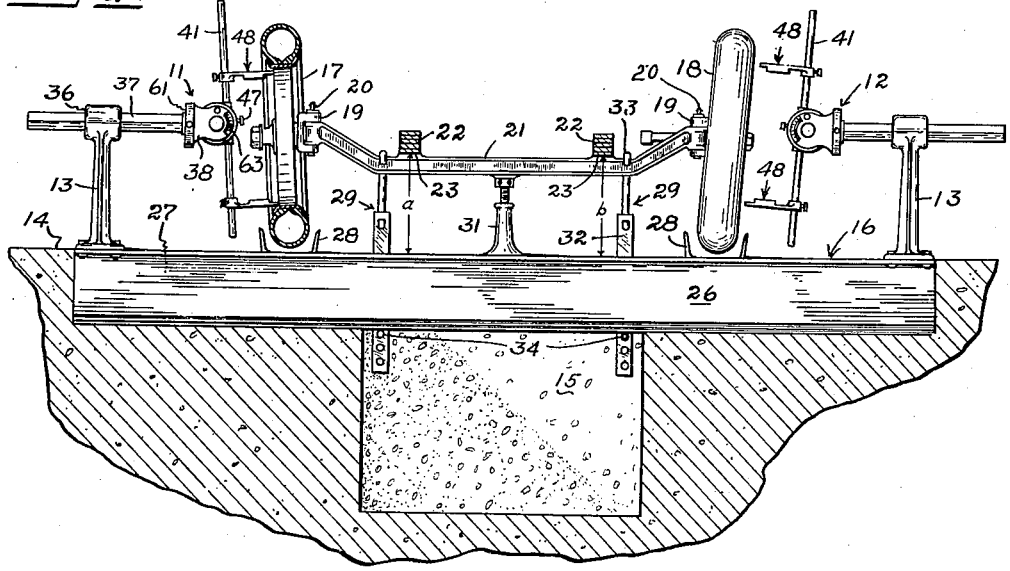
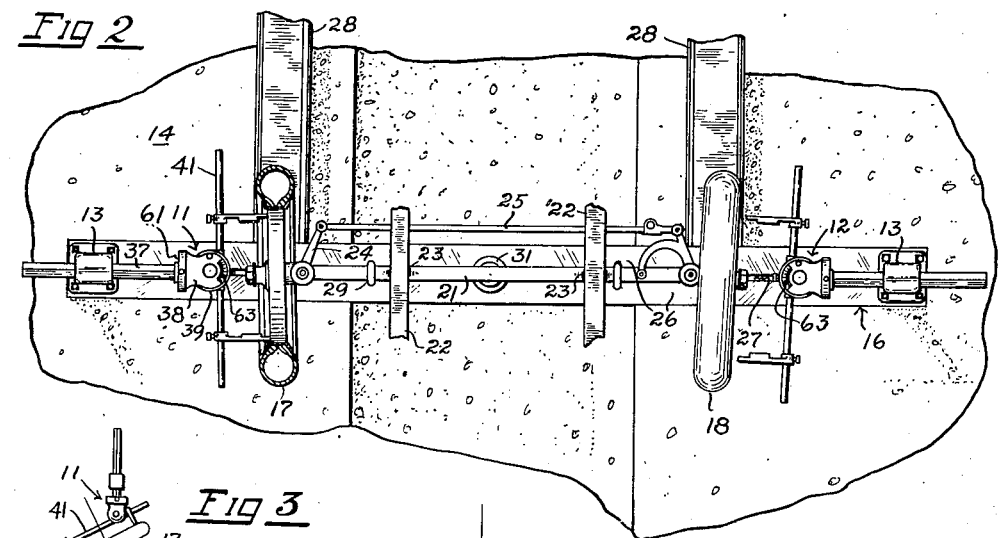
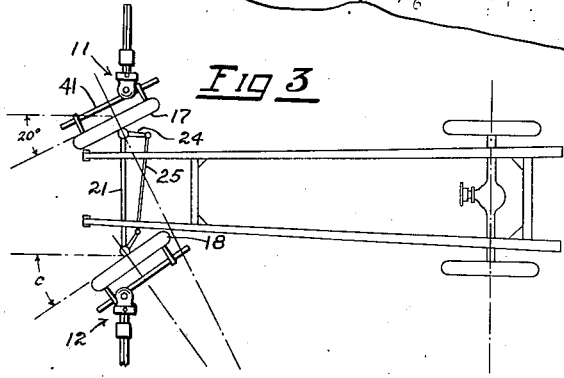
INVENTOR.
John C. Creagmile
BY M. C. Frank
ATTORNEY.

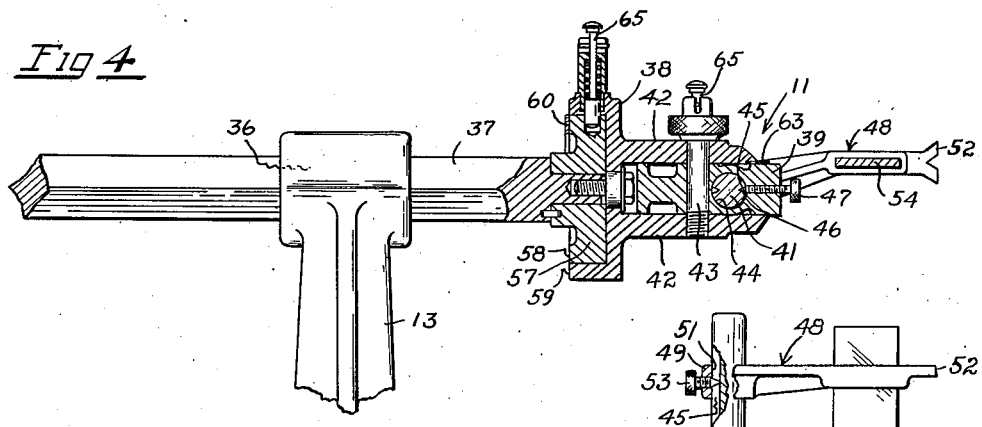
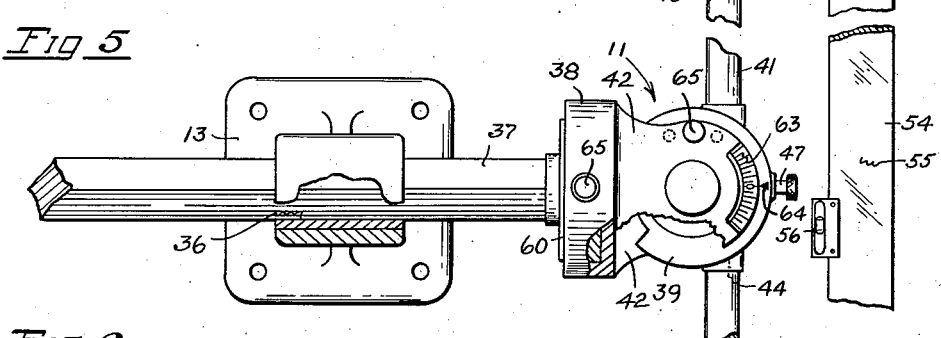
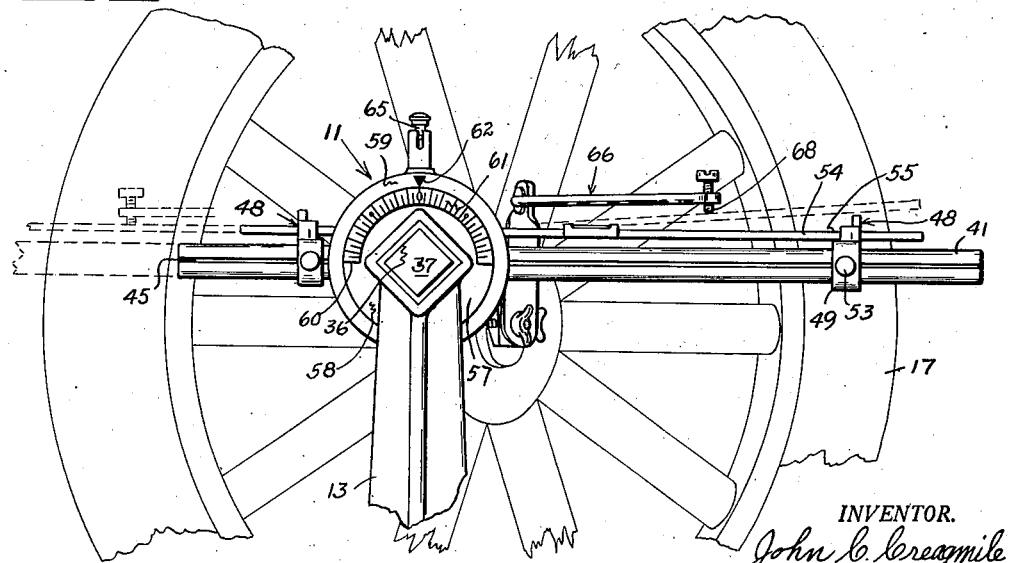

Jan. 12, 1932.  J. C. CREAGMILE  1,840,766
WHEEL ALIGNING DEVICE
Filed Dec. 31, 1929   3 Sheets-Sheet 3
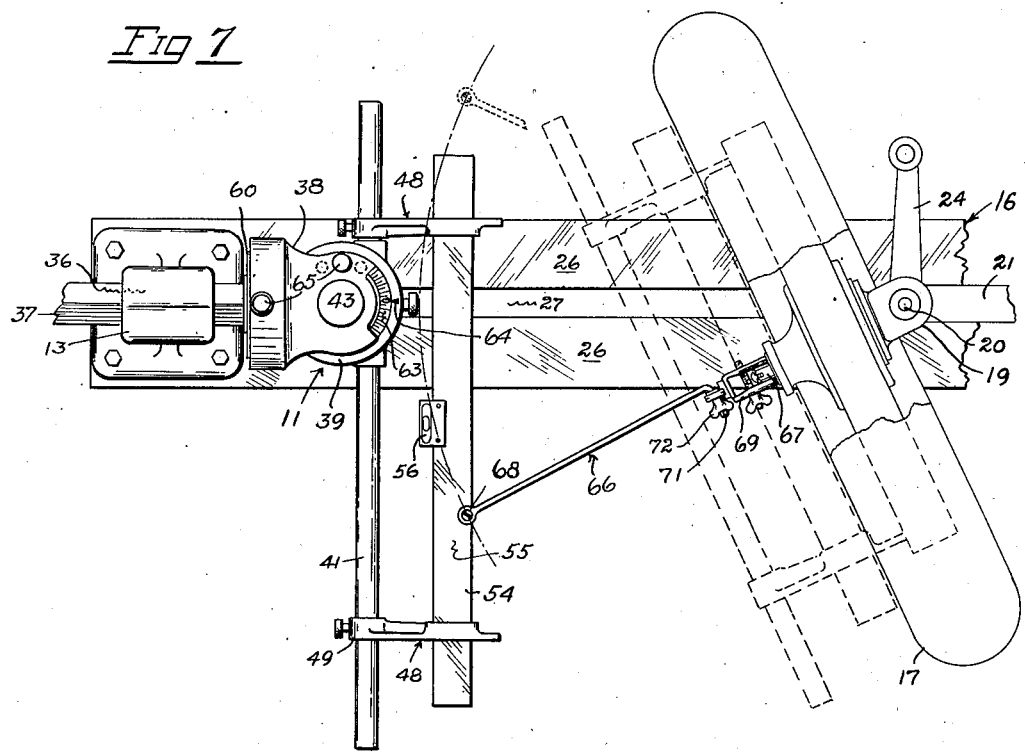
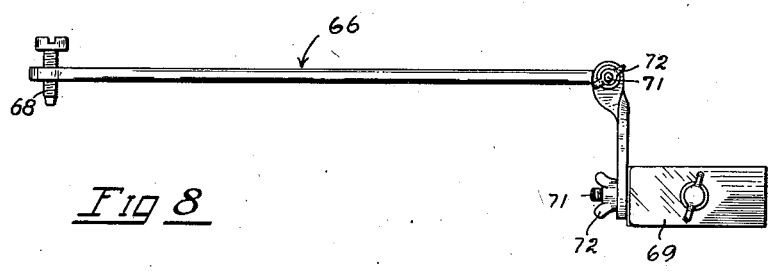
INVENTOR.
John C. Creagmile
BY M. C. Frank
ATTORNEY.

Patented Jan. 12, 1932

1,840,766

UNITED STATES PATENT OFFICE

JOHN C. CREAGMILE, OF BERKELEY, CALIFORNIA

WHEEL ALIGNING DEVICE

Application filed December 31, 1929. Serial No. 417,665.

The invention relates to an apparatus and method for determining the alignment relations of vehicle wheels, and particularly of dirigible wheels.

An object of the invention is to provide a device of the character described whereby the camber, toe-in, turning radius, and caster of wheels may all be gauged in degrees of angle.

Another object of the invention is to provide improved apparatus for the purpose specified wherein a minimum of parts is required for testing.

A further object of the invention is to provide for testing and determining the aforesaid alignment relations of dirigible wheels of a vehicle while the vehicle is retained in the same position thereof, whereby to require but one positioning adjustment for the vehicle for the various settings of the apparatus.

Yet another object is to provide an improved and particularly accurate method for determining the aforesaid alignment relations, and particularly caster.

The invention possesses other objects and features of advantage, some of which, with the foregoing, will be set forth or be apparent in the following description of a preferred form of the invention which is illustrated in the accompanying drawings, in which:

Figure 1 is a partly sectional elevation showing the apparatus as applied for gauging the camber of a pair of dirigible wheels which support a vehicle front axle.

Figure 2 is a plan view of the apparatus and vehicle parts shown in Figure 1, the apparatus being shown as applied for gauging toe-in, certain parts being turned ninety degrees.

Figure 3 is a diagrammatic plan view of the apparatus as it is used for gauging turning radius.

Figure 4 is an enlarged fragmentary and partly sectional side view of a testing unit of the apparatus.

Figure 5 is a fragmentary plan view of the unit shown in Figure 4, portions of the structure being broken away to disclose structural details thereof.

Figure 6 is a fragmentary elevation of the unit and of a wheel being tested for caster therewith, the view of the apparatus being at right angles to that of Figure 4.

Figure 7 is an enlarged fragmentary plan view showing a testing unit of the apparatus in caster-testing relation to a wheel.

Figure 8 is an enlarged side elevation of a pointer element of the apparatus used in testing caster.

In checking and adjusting the alignment relations of the dirigible wheels of vehicles, it is desirable and customary to jointly consider the camber, toe-in, turning radius, and caster of the wheels as alignment factors of importance in determining the performance of the vehicle on the road, whereby to provide for a maximum steerability of the vehicle and at the same time minimize tire slippage and wear. The present apparatus is particularly designed for a ready determination of the alignment of wheels both before and after correction and by means which are positive and dependable.

As particularly illustrated, the present invention is incorporated in the structure of right and left-hand gauging members 11 and 12 mounted on relatively fixed and like standards, or pedestals, 13 extending upwardly from a preferably horizontal floor surface 14. For convenience in making the necessary adjustments of the vehicle parts for correcting the aforesaid alignment factors, a pit 15 is shown provided between the standards 13. A girder 16 spans the pit 15, said girder providing a support for the front portion of a vehicle to be tested. Right and left-hand vehicle wheels 17 and 18 respectively are shown in position for the different tests, said wheels being mounted on the usual spindles of steering knuckles 19 pivoted to the ends of a common axle 21 by means of king pins 20, the structure shown being that of a usual mounting for dirigible front wheels of a motor vehicle. The axle 21 in turn supports the vehicle body (not shown) through springs 22, said springs engaging spaced spring perches 23 on the axle and being only fragmentarily shown. The usual spindle arms 24 extend from the steering knuckles 19 and are connected by a tie-rod 25 (Figure 2) of adjustable length.

Preferably, the girder 16 comprises a pair of channel members 26 disposed edgewise and in slightly spaced back-to-back relation whereby to define a space 27 between them. The channels 26 are relatively fixed and the standards 13 are bolted thereto at opposite ends thereof. The top surface of the girder 16 defined by the members 26 is preferably plane and horizontal, and is shown flush with the floor surface 14 (Figure 1).

For testing the wheels 17 and 18 by means of the apparatus, it is desired that the axle 21 supported by the wheels be in a definite relation to the gauging members 11 and 12, and that the wheels be free to turn about the king pins 20. To assist in disposing said axle as desired, parallel and appropriately spaced channels 28 are set in the floor and at right angles to the longitudinal axis of the girder 16 for so guiding a vehicle as it is moved into position that the longitudinal axis of the vehicle is perpendicular to the girder and the axle 21 is therefore parallel to the girder.

When the tires of the wheels 17 and 18 simultaneously span the space 27 between the girder channels, the axle 21 is arranged to be in desired aligned position. By means of a jack or jacks, engaged between the axle and girder, the wheels are lifted to just clear the top of the girder whereby they may be freely turned about the king pins 20. Preferably, the axle 21 is arranged to be held fixed in its lifted position with the common plane of the spring perches 23 horizontal. As shown, this disposal of the axle 21 is assured and provided by the use of a pair of tension members 29 hooked over the axle 21 adjacent the perches 23, and a screw jack 31 engaging the axle between said tension members and supported on the top of the girder whereby to secure the axle against any displacement. The tension members 29 comprise straps 32 carrying C-shaped hooks 33 at their upper ends and having their lower ends depending through the girder space 27 and below the girder. The lower ends of the straps 32 are perforated to receive pins 34 for engagement beneath the girder members 26 whereby to anchor the tension members as the axle is raised by the jack. A number of pin-receiving perforations are provided in each strap 32 whereby the effective lengths of the tension members may be adjustably varied, adjustment being made to provide for the disposal of the spring perches in the same horizontal plane. For effecting the latter adjustment, a spirit level may be applied between and beneath the springs 22, or the distances from said springs to the girder be made equal; the measurement of the latter is indicated in Figure 1 wherein the distance $a$ should equal distance $b$.

Each of the standards 13, it will now be noted, is formed to provide an horizontally directed guideway 36, said guideways being axially aligned when the standards are mounted in place on the girder 16. The similar gauging members 11 and 12 essentially comprise elongated bars 37 for engagement in the standard guideways 36 and having heads 38 swivelled thereto at the inner ends thereof for rotation about the bar axes. Each head 38 in turn pivotally carries a block 39 to which is fixed a testing bar 41, the axis of pivoting of the block 39 being perpendicular to the axis of the bar 37. The bar 37 is non-rotatably and slidably engaged in the guideway 36; as shown, the bar and guideway are of like and polygonal section for the purpose. In the present instance, the block 39 is shown as generally disc-shaped and is engaged between parallel ears 42 extending axially from the head 38, said block being rotatable about a shaft-pin 43 extending through and between said ears, Figure 4.

For reasons to be hereinafter brought out, the mounting of the testing bar 41 on the block 39 is such that said bar is adjustable solely longitudinally of itself; as particularly shown, the bar 41 is of a generally cylindrical and uniform section for fitted and slidable engagement in a perforation 44 extending laterally through the block 39, said perforation being perpendicularly transverse to the pivotal axis of the block. The bar 41 is arranged to be held against rotation and in adjusted position in the perforation 44; as shown, the bar 41 is provided along its length with a pair of diametrically opposed V-grooves 45 in one of which the conical point 46 of a set-screw 47 mounted in the block 39 is arranged to engage and be set.

Arms 48 are adjustably mounted on the bar 41 at opposite sides of the block 39 to extend forwardly from the bar. The arms 48 are alike and the inner arm ends 49 are provided with bores 51 for the sliding reception of the bar 41. The outer arm ends provide gauging points 52 for use in a manner to be hereinafter described, and the line of said points is preferably parallel to the axis of the bar 41. For insuring the latter condition, the inner arm ends 49 have V-pointed set-screws 53 mounted therein for projection into the arm bores 51 and a groove 45 of the bar 41, this structure being particularly brought out in Figures 5 and 6 and assuring the desired parallelism of the line of gauge points 52 with the bar axis.

The arms 48 are also arranged to removably support a reference plate 54 (Figures 4 to 7) in generally horizontal position and for use in testing caster. As shown, the plate 54 is of uniform rectangular section and the arms 48 are intermediately perforated to support said plate through and between them.

For purposes of clearance in manipulating the apparatus, the arm portions which receive the plate 54 are offset upwardly (Figure 4), whereby the plane of the top, and reference, surface 55 of the plate is tangent to or slightly above the rod 41, the latter being generally preferred. The plate 54 is provided with a level bubble 56 whereby it may be levelled by adjusting the head 38 about its horizontal axis when and as required. It is noted that the reference plate 54 might, if desired, be also used as a carpenter's level in effecting the primary levelling of the axle in setting the same for testing, in lieu of making the measurements hereinbefore described.

The various determinations for camber, toe-in, turning radius, and caster are all measurable in the present apparatus in terms of degrees of angle, and means are accordingly provided for measuring the angular degrees of rotation from initial zero positions of the heads 38 and blocks 39 about their respective axes of rotation. As particularly illustrated in Figures 4 and 6, a disc-shaped member 57 is mounted on the head-carrying end of the bar 37 and engages within a cavity provided in the opposed end of the head 38 whereby the respective outer faces 58 and 59 of said member and head will be disposed in the same plane. The face 58 is provided with an arcuate dial plate 60 calibrated adjacent said line with markings indicating angular measure, with the zero of the scale 61 thus provided being in a vertical plane through the axis of the bar 37. Preferably, the head 38 is considered as being in its zero rotative position when the testing bar 41 carried thereby is horizontal; accordingly, an index point 62 is provided on the face 59 for registration with the zero of the scale 61 when the bar 41 is horizontal, this being the condition shown in Figure 6. An ear 42 of the head 38 is circularly rounded at its outer end and about the pivotal axis of the block 39, and the block 39 is arranged to extend radially inwardly beyond said ear. Said rounded ear end is provided with a scale 63 in the form of a calibrated flat quadrant and the radially adjacent face of the block 39 is provided with an index point 64 for alignment with the various graduations of the scale 63. Preferably, the zero point of the scale 63 lies in a vertical plane through the axis of the bar 37 and the index point 64 is so placed on the block 39 that it registers with the zero of the scale 63 when the bar 41 extends perpendicularly of said axis. In this manner, any displacements of the head 38 and block 39 from their zero positions aforesaid are arranged to be positively measured in angular degrees. If desired, displaceable stop pins 65 may be provided for securing the head and bar in their zero, or other positions.

In determining camber with the apparatus now described, the heads 38 of the members 11 and 12 are positioned to dispose the bars 41 in upright position (Figure 1) whereby the scales 61 read ninety degrees. By use of the scales 63, the bars 41 are then set to the desired camber angle and the members 11 and 12 moved toward the respective wheels until the relations of the test points 52 of the arms 48 to the felly or some other planar and fixed wheel element, may be determined. If the line of the test points proves to be parallel to the plane of the felly, or other wheel element of reference, the setting of a wheel as to camber is correct. But if the camber of a wheel is appreciably off, the axle 21 must be bent in a vertical plane to correct the condition; in correcting for camber, a method and apparatus is preferably used which effects only the setting of the wheel being adjusted. It is noted that the adjustability of the arms 48 along the bar 41 permits their disposal for engagement with the felly or other reference element of wheels of different sizes, both in this and other tests.

An arrangement of the apparatus as for gauging toe-in is disclosed in the plan view of Figure 2. For this use of the apparatus, the reading of the scales 61 would be zero and the bars 41 would be set by use of the scales 63 for an appropriate toe-in angle and moved toward the wheels until the arm points register therewith. Any required adjustment for toe-in is made through appropriately changing the effective length of the tie-rod 25.

The same set-up as for toe-in gauging is used for determining turning radius. As particularly illustrated in the diagrammatic view of Figure 3, a determination for a left turn is to be made. In this case, the right front wheel 17 is the outside wheel and is set at twenty degrees from straight-ahead by means of a twenty degree setting of the bar 41 in the head 38 of the member 11, the scale 63 being utilized in making the setting. The simultaneous angular position of the left wheel 18 is then determined by setting the bar 41 of the head 38 of the test member 12; the angle $c$ found should generally exceed twenty degrees, and its correct value, which depends on the vehicle wheel base and other factors, is determinable from tables which have been prepared for the purpose. It is noted that the twenty degree initial setting of the outside wheel is purely arbitrary, the angle used depending on that used as the basis of an available table. Correction for turning radius is made by bending the appropriate spindle arm 24 in a horizontal plane.

In the determination of caster, the methods and apparatus generally used heretofore have not proved to be sufficiently dependable on account of the many factors which have required simultaneous consideration; in using the present apparatus, direct and positive results are assured with a high degree of accuracy thereof. For caster determination, the wheels are tested separately and independently, the testing of the right wheel 17 being indicated in Figures 6 and 7 and being herein specifically described. In preparing the apparatus for this test, the reference plate 54 is mounted in and between the test arms 48 of the gauging member 11, with the bar 41 in its horizontal setting. A finger 66 (Figures 6, 7 and 8) provided for the purpose is next mounted on the nut 67 of the spindle carrying the wheel 17 to extend generally axially from the spindle, said finger having a gauge point 68 at its free end for vertical adjustment and being formed to have its extending portion generally overlie the plane of the upper surface 55 of the plate 54. The specific finger structure is generally immaterial to the present invention except that the point 68 be primarily adjustable with respect to the spindle, and that means be provided for positively securing said point in an adjusted position thereof; as shown, the finger includes a clamp portion 69 for fixing it to the nut 67 and is formed with pivotally related sections which may be fixed together against relative movement by means of bolts 71 and wing-nuts 72.

The first step in making a caster test with the present apparatus is to set the wheel 17 at some arbitrary angle in a right-turn direction; in practice said angle is usually twenty-five degrees. This setting of the wheel 17 may conveniently be made by an appropriate setting of the bar 41, using scale 63, and moving the member 11 inwardly toward the wheel for setting the wheel to the points of the arms 48. With the wheel set, the member 11 is withdrawn, the bar 41 is swung back to its zero position at right angles to the bar 37, and the member 11 is then appropriately shifted to dispose the plate 54 beneath the finger point 68. The reference plate 54 is now exactly levelled longitudinally thereof by use of the level bubble 56 thereon, this being desirable by reason of the small angle to be measured; while the test members 11 and 12 might be initially set and adjusted to support the plate 54 with its test surface 55 exactly horizontal when the scale 63 reads zero, the use of the level bubble positively assures the necessary accuracy. With the reference plate levelled, the finger point 68 is adjusted to touch, or nearly touch, the reference surface 55 of the plate, and the wing-nuts 72 are turned-up on the bolts 71 to fix the point 68 relative to the wheel spindle which carries it.

The test member 11 is now withdrawn to permit a swinging of the wheel 17 to a left-turn position of the same angularity as its first setting, this position of the wheel being particularly shown in Figures 6 and 7. In re-setting the wheel in the new position, the member 11 may again be used as for the first setting, the necessary positioning and adjustment of the member 11 for the purpose being indicated in dash lines in Figure 7. To permit the necessary disposal of the member 11 adjacent the wheel for setting it, the previously mentioned upward offsets in the arms 48 are arranged to dispose the gauging surface 55 of the plate 54 at or above the top level of the bar 41 which carry them and the finger 66 is also appropriately shaped to provide the desired clearance. If the king pin 20 has any rearward caster at all, the finger point 68 will be raised as the wheel is swung from right-turn to left-turn position, and said point will clear the member 11 for the use of said member in setting the wheel to the required left-turn angle; should a reverse caster obtain, the wheel would be first set in a left-turn position for the test.

With the wheel 17 in its new set position, the member 11 is withdrawn and the bar 41 is again set perpendicular to the bar 37 and to again dispose the plate 54 beneath the finger point, it being noted that with the relatively short plate shown, a longitudinal shifting thereof is required between its two test positions and that this shifting is best effected by longitudinally shifting the rod 41 in its mounting in the head block 39, the arms 48 then not needing any readjustment thereof on the rod 41. With the plate 54 again level, a reading of the scale 61 is taken. The head 38 is now rotated about its axis until the finger point 68 again assumes the same relation to the surface 55 as for its first setting, and a second reading at the scale 61 is taken. Since the horizontal axis of rotation of the head 38 is opposite the axle axis, the degree of turning of the head 38 as determined by the scale 61 is double the angular rise of the pointer point 68 between its two positions, and is therefore double the caster angle; in this manner, if the caster angle is two degrees, the angular movement of the head 38 will be four degrees. The relation is brought out in Figure 6 wherein the final disposal of the plate 54 is indicated in dash lines. Any required correction for caster is made by the use of wedge-shaped shims (not shown) between the springs 22 and spring-perches 23, or by appropriately twisting the axle 21 at one or both ends thereof as may be required.

It is particularly noted that the present method of determining caster by measuring angles is independent of the length of the pointer 66 or the measurement of any distances. Furthermore, the apparatus now described is arranged to be universally used for testing vehicles of different design without requiring a substitution or use of special parts or the movement of the vehicle from place to place. Since the tests for camber, toe-in, turning radius, and caster with the present apparatus are all made in terms of angle measurements, a minimum of readings and corrections is required in using the apparatus, and the making of tests, and necessary corrections determined thereby, may be accomplished in a minimum of time.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In apparatus for gauging the settings for camber and toe-in and turning radius and caster of a cooperative pair of dirigible wheels of a vehicle, said wheels supporting an axle between them, testing members for disposal at opposite ends of said axle and generally outwardly of said wheels and including test bars, means carrying said members for translation solely in a common line parallel to said axle, means to angularly adjust said test bars independently and about axes respectively parallel and perpendicular to said line of translation of the members, and means to determine the degree of angular adjustment of a bar about either said axis and from an initial position thereof whereby to determine the aforesaid settings.

2. In apparatus for gauging the settings for camber and toe-in and turning radius and caster of a pair of dirigible wheels of an automobile or the like, a gauging member comprising an horizontal bar mounted for adjusted disposal solely along an horizontal axial line thereof, a head swivelled to said bar for rotative adjustment about said axial line of said bar, a test bar pivoted to said head for adjustment about an axis perpendicular to and intersecting said axial line, and scale means on said first bar and head cooperative to measure the angular degree of rotative displacement of said head from an initial position thereof.

3. In apparatus for gauging the settings for camber and toe-in and turning radius and caster of a pair of dirigible wheels of an automobile or the like, a gauging member comprising an horizontal bar mounted for adjusted disposal solely along an horizontal axial line thereof, a head swivelled to said bar for rotative adjustment about said axial line of said bar, a test bar pivoted to said head for adjustment about an axis perpendicular to and intersecting said axial line, and scale means for independently ascertaining the angular degrees of displacement of said head about said axial line and of said test bar about said axis.

4. In apparatus for gauging the caster of a dirigible wheel rotatable on a spindle pivoted to an axle, a gauge plate, means supporting said plate in substantially horizontal position transversely of said axle and for angular adjustment about a fixed horizontal axis substantially in the line of said axle, a finger for mounting on said spindle for swinging movement therewith between right-turn and left-turn positions thereof whereby the point of said finger moves in an upwardly inclined line from one said position to the other and above said plate, means to level said plate, means to adjust said finger whereby the point thereof contacts said levelled plate when the wheel is in the lower said position thereof, and means to measure the degree of angular rotation of said plate about said axis thereof to contact said finger point when the same is in the upper said position thereof.

In testimony whereof, I affix my signature.

JOHN C. CREAGMILE.